United States Patent
Ash et al.

(10) Patent No.: US 9,864,532 B2
(45) Date of Patent: Jan. 9, 2018

(54) PERFORMING PREPROCESSING OPERATIONS IN ANTICIPATION OF LOG FILE WRITES

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 14/751,703

(22) Filed: Jun. 26, 2015

(65) Prior Publication Data
US 2016/0378368 A1 Dec. 29, 2016

(51) Int. Cl.
G06F 13/28 (2006.01)
G06F 3/06 (2006.01)

(52) U.S. Cl.
CPC .......... *G06F 3/0619* (2013.01); *G06F 3/0655* (2013.01); *G06F 3/0688* (2013.01); *G06F 13/28* (2013.01)

(58) Field of Classification Search
CPC .... G06F 3/0619; G06F 3/0655; G06F 3/0688; G06F 13/28
See application file for complete search history.

(56) References Cited

U.S. PATENT DOCUMENTS

| 5,297,258 A * | 3/1994 | Hale ..................... G06F 3/0601 711/113 |
| 5,581,750 A * | 12/1996 | Haderle .............. G06F 11/1471 |
| 5,835,955 A * | 11/1998 | Dornier ............... G06F 12/0866 711/162 |
| 6,141,731 A * | 10/2000 | Beardsley ............. G06F 12/127 711/133 |
| 2006/0036660 A1 | 2/2006 | Lynn |
| 2009/0005987 A1* | 1/2009 | Vengroff ................ G06Q 30/02 701/300 |
| 2012/0191908 A1 | 7/2012 | North et al. |
| 2012/0284459 A1* | 11/2012 | Gill ..................... G06F 12/0866 711/113 |
| 2014/0108839 A1 | 4/2014 | Horikawa |
| 2014/0279917 A1 | 9/2014 | Minh et al. |

OTHER PUBLICATIONS

U.S. Appl. No. 14/751,725, filed Jun. 26, 2015.
Office Action, dated Jun. 29, 2017, for U.S. Appl. No. 14/751,725, filed Jun. 26, 2015, invented by Kevin J. Ash et al., Total 13 pages.
U.S. Appl. No. 15/814,121, filed Nov. 15, 2017, (18.562C1).
Response dated Sep. 29, 2017, pp. 10, to Office Action dated Jun. 29, 2017, pp. 13, for U.S. Appl. No. 14/751,725, filed Jun. 26, 2015, (18.573).

* cited by examiner

*Primary Examiner* — Jing-Yih Shyu
(74) *Attorney, Agent, or Firm* — Rabindranath Dutta; Konrad Raynes Davda & Victor LLP

(57) ABSTRACT

A location of a log file is determined, wherein data corresponding to writes is written sequentially starting from a starting block of the log file. A determination is made in the log file of a range of blocks in which data corresponding to a next write is anticipated to be written. Preprocessing operations are performed corresponding to the range of blocks of the log file in which the data corresponding to the next write is anticipated to be written.

18 Claims, 10 Drawing Sheets

PERFORMING PREPROCESSING OPERATIONS IN ANTICIPATION OF LOG FILE WRITES

BACKGROUND

1. Field

Embodiments relate to the performing of preprocessing operations in anticipation of log file writes.

2. Background

A storage controller may be coupled to one or more of a plurality of hosts. A storage management application that executes in the storage controller may manage a plurality of storage devices, such as disk drives, tape drives, flash drives, etc., that are coupled to the storage controller. The plurality of hosts may access data stored in the storage devices via the storage controller.

Host applications that execute in the plurality of hosts may create logical storage volumes, and subsequent to the creation of the logical storage volumes write to logical addresses of the logical volumes. The host applications may also read from logical addresses of the logical storage volumes.

One or more log files may be maintained in the storage controller, where a log file is a file that may record events, transactions, etc., that may occur within the storage controller or that may occur under the control of the storage controller or the host. The log file may also record events, transactions, etc., that are communicated to the storage controller. For example, event logs stored in the log file may record events that take place in the execution of a system in order to provide an audit trail that may be used to understand the activity of the system and to diagnose problems. Transaction logs stored in the log file may record changes to the stored data to allow a database system to recover from crashes or other data errors and maintain the stored data in a consistent state. Database systems usually have both general event logs and transaction logs. Many other types of data may be stored in the one or more log files that are maintained in the storage controller. The processing of log files and the performing of operations on the log file may take a significant amount of time.

SUMMARY OF THE PREFERRED EMBODIMENTS

Provided are a method, a system, a storage controller, and a computer program product in which a location of a log file is determined, where data corresponding to writes is written sequentially starting from a starting block of the log file. A determination is made in the log file of a range of blocks in which data corresponding to a next write is anticipated to be written. Preprocessing operations are performed corresponding to the range of blocks of the log file in which the data corresponding to the next write is anticipated to be written. As a result, as many preprocessing operations as possible may be performed in anticipation of the next log file write.

In certain optional embodiments, in response to performing the preprocessing operations, and in response to receiving the next write, the data corresponding to the next write is written in at least one or more blocks of the range of blocks of the log file. As a result, the next log file write may be completed with a faster response time (i.e., lower latency), in comparison to the situation where the preprocessing operations are not performed in anticipation of the next log file write.

In further optional embodiments, in response to writing the data in the at least one or more blocks of the range of blocks of the log file, operations are performed to free one or more resources blocked by the preprocessing operations. Operations are also performed to allow one or more operations blocked by the preprocessing operations to be executed. The freeing of resources allows the resources to be reused, and by unblocking the blocked operations the blocked operations may continue execution.

In additional optional embodiments, the preprocessing operations include: preallocating task control blocks for the next write; performing start I/O checking, where the start I/O checking determines whether an I/O is allowed to be performed; and performing intercepts of pending copy operations to determine if the pending copy operations are to be performed before or after the data corresponding to the next write is processed. The performing of the start I/O checking and the performing of the intercepts of pending copy operations in anticipation of the next log file write allows the next log file write to be performed with a faster response time.

In yet additional optional embodiments, the preprocessing operations further include performing operations on a cache, and performing operations on a non-volatile store in which a copy of data in the cache is stored. The performing of the operations on the cache and the performing of the operations on the non-volatile store in anticipation of the next log file write allows the next log file write to be performed with a faster response time.

In still additional optional embodiments, the preprocessing operations further include allocating hardware resources for a direct memory access (DMA) for the next write. The pre-allocation of hardware resources for DMA in anticipation of the next log file write allows the next log file write to be performed with a faster response time.

In certain optional embodiments, the preprocessing operations are terminated if: the next write is not received in a predetermined amount of time; or a task with a higher level of priority than the next write needs a resource that is locked by the preprocessing operations; or a non-adjacent I/O is received; or the log file is to be closed in response to an error recovery or a transition of a storage controller that includes the processor. The terminating of the preprocessing operations allows other operations blocked for preprocessing to continue, and resources reserved for the preprocessing operations may be used once again.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made, Certain embodiments provide mechanisms for performing as many preprocessing operations as possible in anticipation of the next log file write. As a result, the next log file write may be completed with a faster response time (i.e., lower latency), in comparison to the situation where the preprocessing operations are not performed in anticipation of the next log file write.

In certain embodiments, the storage controller may identify a range of blocks (or tracks or extents or some other unit of storage) that are associated with the log file. Since data is written sequentially to a log file, the preprocessing operations for writing to the next sequential blocks of the log file are performed prior to receiving the next write request for writing to the log file.

While anticipatory reads from storage have been performed earlier, anticipatory processing in advance of future writes to log files may save a significantly greater amount of time as writes typically take a much longer time than reads. Since writes to log files are sequential there is no way of decreasing latency of writes via parallel writes to log files. As a result, the anticipatory processing in advance of future writes to log files decreases the latency of writes to log files.

Log file write response time is critical to application and database. Reduction of log file response time allows faster transaction commit times in databases and allows more transactions to be processed per second.

Exemplary Embodiments

Figure 1:
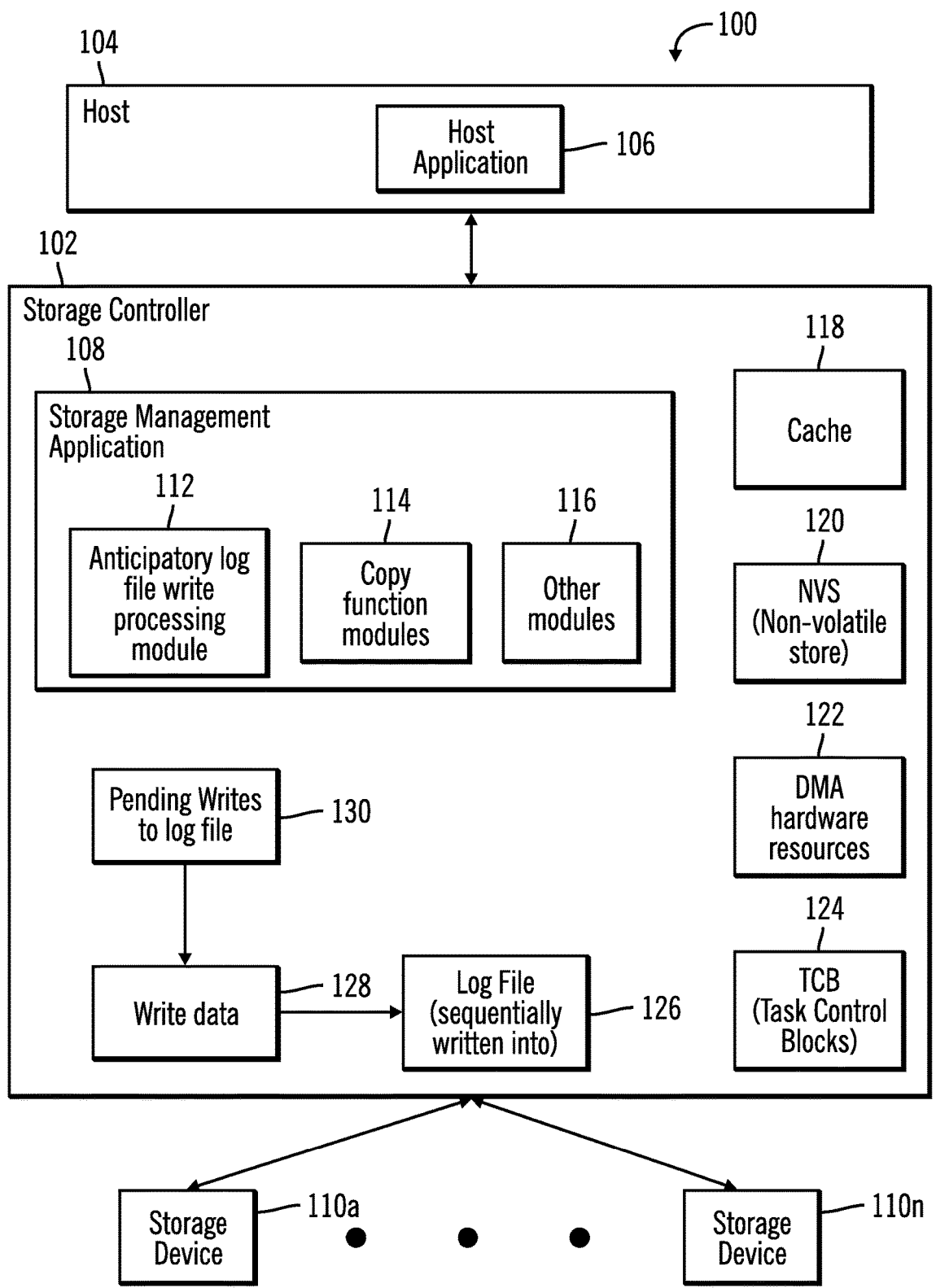
FIG. 1 illustrates a block diagram of a computing environment comprising a storage controller coupled to a host, where the storage controller includes an anticipatory log file write preprocessing module, in accordance with certain embodiments.

FIG. 1 illustrates a block diagram of a computing environment 100 comprising a storage controller 102 coupled to a host 104 via a network or a direct link, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via a suitable network such as the Internet, an intranet, a storage area network, etc. A host application 106 executes in the host 104 and a storage management application 108 executes in the storage controller 102, where the host application 106 and the storage management application 108 may be implemented in software, hardware, firmware or any combination thereof.

The storage controller 102 controls access to one or more storage devices 110a . . . 110n that are coupled to the storage controller 102. The storage devices 110a . . . 110n may include any suitable storage devices such as magnetic disk drives, tape drives, solid state drives (i.e., flash drives), etc.

The storage management application 108 may include an anticipatory log file write processing module 112, one or more copy function modules 114, and other modules 116, where the modules 112, 114, 116 may spawn processes or tasks under the control of the storage management application 108.

The storage controller 102 also includes a cache 118, a non-volatile store (NVS) 120, direct memory access (DMA) hardware resources 122, and task control blocks (TCB) 124. The cache 118 and the NVS 120 may comprise storage with lower latency (i.e., higher speed) in comparison to the storage devices 110a . . . 110n. The NVS 120 may retain data even in the event of a power outage and may store a copy of the cache 118 or some other data. The DMA hardware resources 122 allow certain hardware subsystems to access main system memory of the storage controller 102 independently of the central processing unit (CPU) of the storage controller 102. The TCBs 124 are data structures corresponding to processes or tasks that execute in the storage controller 102 for performing writes, copies, staging to cache, destaging from cache, and other operations.

The storage controller 102 stores a log file 126 that is sequentially written into. Write data 128 may be written sequentially into the log file 126. Pending writes 130 for the log file 126 have to wait while the write data 128 is being written sequentially to the log file 126.

In certain embodiments, the storage controller 102 may receive write requests from the host application 106 to write to the log file 126. The write requests may also be generated internally by the storage controller 102. The anticipatory log file write processing module 112 may anticipate that write data is to be written to the log file 126 in the next sequential set of blocks of the log file 126 and perform preprocessing operations in anticipation of receiving the next write request for writing to the log file 126. Once the write is performed on the log file 126, other operations held up by the preprocessing operations are allowed to execute, and resources blocked by the preprocessing operations are freed.

Figure 2:
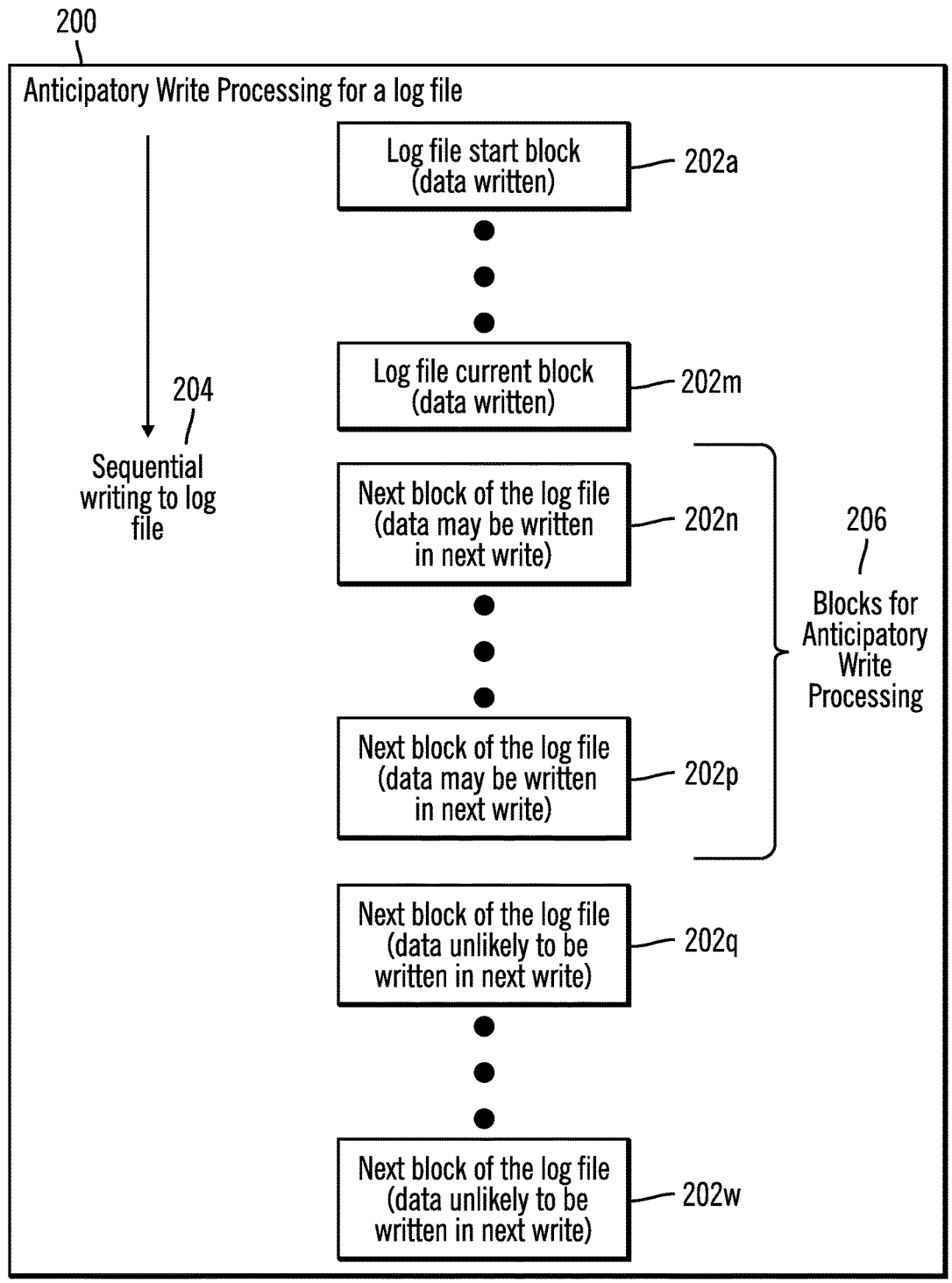
FIG. 2 illustrates a block diagram that shows the blocks of a log file, and selected blocks for anticipatory write processing, in accordance with certain embodiments.

FIG. 2 illustrates a block diagram 200 that shows the blocks of a log file, and selected blocks for anticipatory write processing, in accordance with certain embodiments.

In FIG. 2, the start block of the log file is shown via reference numeral 202a. Blocks 202a . . . 202m are sequentially located in the log file and data has been written sequentially (shown via reference numeral 204) on these blocks 202a . . . 202m.

The next sequential range of blocks 202n . . . 202p may be the blocks for anticipatory write processing (shown via reference numeral 206), as the next write to the log file is likely to be written to these range of blocks 202n . . . 202p.

The blocks 202q . . . 202w after this range of blocks may be written much later and may or may not have been allocated to the log file as yet.

In certain embodiments, the anticipatory log file write processing module 112 selects the blocks 202a . . . 202p for anticipatory write processing and performs the preprocessing operations that are needed for preparing these blocks 202a . . . 202p for being written into, prior to performing the next write on the log file.

To perform the operations shown in FIG. 2, a log file write stream is identified (to identify the location of the log file). This may be done by defining a new set of commands to the host 104 that define a range of blocks/tracks that are associated with a file. If the log file is split into non-contiguous parts (e.g., in the event of log striping for file system fragmentation), each contiguous part of the log file is defined either as one of several extents included in the command or in a new command. The command can be delivered inband over fiber channel or out of band over Ethernet.

An alternative embodiment may determine which files are having data written on them sequentially, and an attempt may be made to perform preprocessing operations for the next writes on all such files. This is less advantageous because other less important writes may be prioritized which may delay the log file writes as resources are consumed for reducing the latency the other files on which data is being written sequentially. It should be noted that log file writes may be of greater importance than many other types of writes. Therefore, the alternative embodiments that automatically detect sequential writes is not as desirable since many other writes besides log file writes are sequential and such writes may not need the semi-permanent resource usage that log file writes need.

Figure 3:
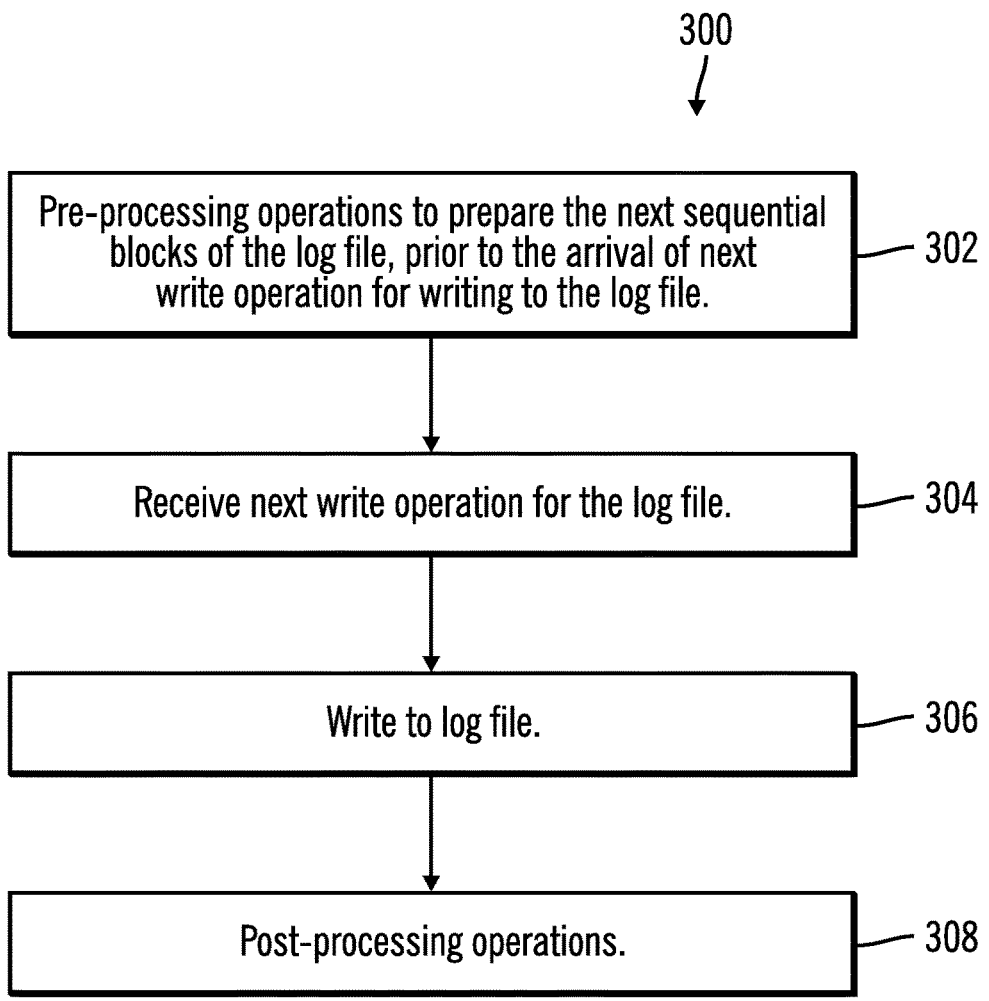
FIG. 3 illustrates a flowchart that shows operations for processing writes to log files, in accordance with certain embodiments.

FIG. 3 illustrates a flowchart 300 that shows operations for processing writes to a log file, in accordance with certain embodiments. The operations shown in FIG. 3 may be performed by the anticipatory log file write processing module 112 of the storage management application 108 that executes in the storage controller 102.

Control starts at block 302 in which the anticipatory log file write processing module 112 performs the pre-processing operations to prepare the next sequential blocks of the log file 126 prior to the arrival of the next write operation for writing to the log file 126. Then the next write operation for the log file 126 is received (at block 304) and the log file 126 is written into (at block 306). Subsequently, at block 308, the anticipatory log file write processing module 112 performs post-processing operations to release resources and operations that were locked and blocked respectively during the pre-processing operations.

Figure 4:
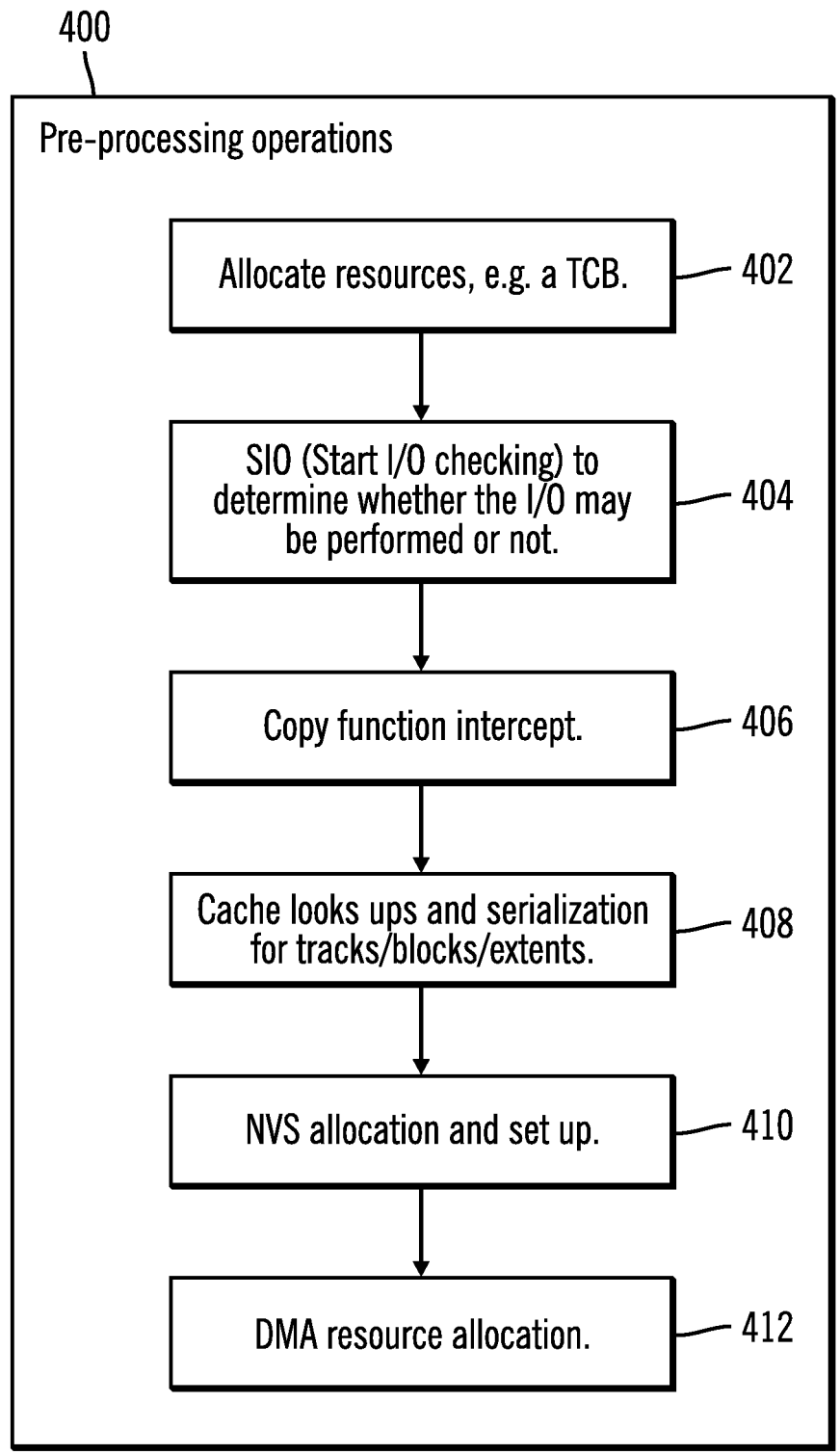
FIG. 4 illustrates a flowchart that shows pre-processing operations prior to receiving the next write to a log file, in accordance with certain embodiments.

FIG. 4 illustrates a flowchart that shows pre-processing operations 400 prior to receiving the next write to a log file, in accordance with certain embodiments. The operations shown in FIG. 4 may be performed by the anticipatory log file write processing module 112 of the storage management application 108 that executes in the storage controller 102.

The operations shown in FIG. 4 are performed ahead of time for some number for tracks (e.g., 4-8 tracks) prior to receiving the next write from the host 104 for the log file 126. When the host write is received, the stream is recognized (either by new data in the write command or by locating the new data) and the processing can proceed to write the new data.

Control starts at block 402 in which the anticipatory log file write processing module 112 allocates resources such as TCBs 124 for the next write operation. In certain embodiments, the log write stream is set up such that it pre-allocates a set of resources such as TCBs to stay N number of writes ahead of the host 104.

Control proceeds to block 404, in which a start Input/Output (I/O) [SIO] checking is performed to determine whether I/O operations can be performed at this point in time. For example a determination may be made as to whether a TCB can actually run at this point in time.

Control proceeds to block 406 in which copy operations (e.g., point-in-time copy etc.) performed by the copy function modules 114 are intercepted to determine if copy functions are to be performed before or after the next write to the log file on the next sequential blocks. If copy functions have to be performed before, such copy functions are performed or else such copy functions may wait for the write to the log file to be executed.

Control then proceeds to block 408 in which cache look ups on the cache 118 and serialization for tracks, blocks, or extents are performed prior to performing the next write. The NVS 120 is allocated and set up (at block 410) in preparation for the next write. The processing operations on the cache 118 and NVS 120 may have to complete prior to the next write or such operations may have to be held based on usage of same addresses, etc.

Control then proceeds to block 412 in which DMA hardware resources 122 may be allocated in advance of the next write operations. The DMA hardware resources 122 may correspond to the subset of hardware paths the next write is going to come in on, and corresponding addresses may be allocated in a Peripheral Component Interconnect (PCI) address range Once the operations shown in FIG. 4 are completed, the next write data may be written on the log file 126.

Figure 5:
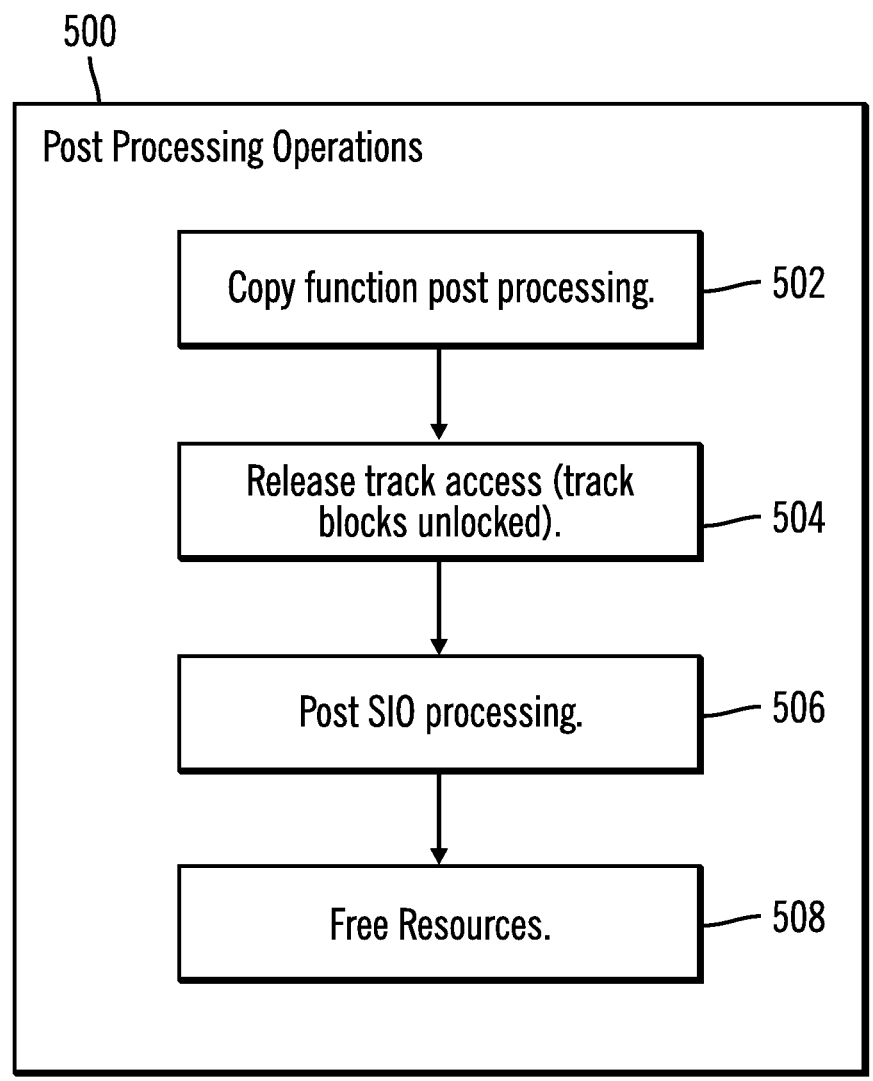
FIG. 5 illustrates a flowchart that shows post-processing operations performed after writing the data corresponding to the next write to the log file, in accordance with certain embodiments.

FIG. 5 illustrates a flowchart that shows post-processing operations performed after writing the data corresponding to the next write to the log file 126, in accordance with certain embodiments. The operations shown in FIG. 5 may be performed by the anticipatory log file write processing module 112 of the storage management application 108 that executes in the storage controller 102.

Control starts at block 502 in which the copy functions that were blocked in the pre-processing operations are executed. Track access is released (at block 504) and track blocks are unlocked. In some embodiments, the operations of block 504 may be eliminated. For example, if the host write did not end on a cache block/track boundary, access can often be retained. The NVS is informed that the data blocks written should be committed. If the write ends on a track boundary then the track access is released. In addition, some copy functions, for example synchronous replication may require the track lock to be converted to a shared lock during this step. When the copy function completes, exclusive access may be regained (if still required for the track). Other copy functions may allow track access to be retained.

The post SIO processing shown in block 506 allows other waiting processes to proceed. Control proceeds to block 508 in which in the post-processing operations, the resources are not always released (eliminating clean-up of the resource as well as contention for resource lock), but some processing may need to reuse the resource or free some resources.

Figure 6:
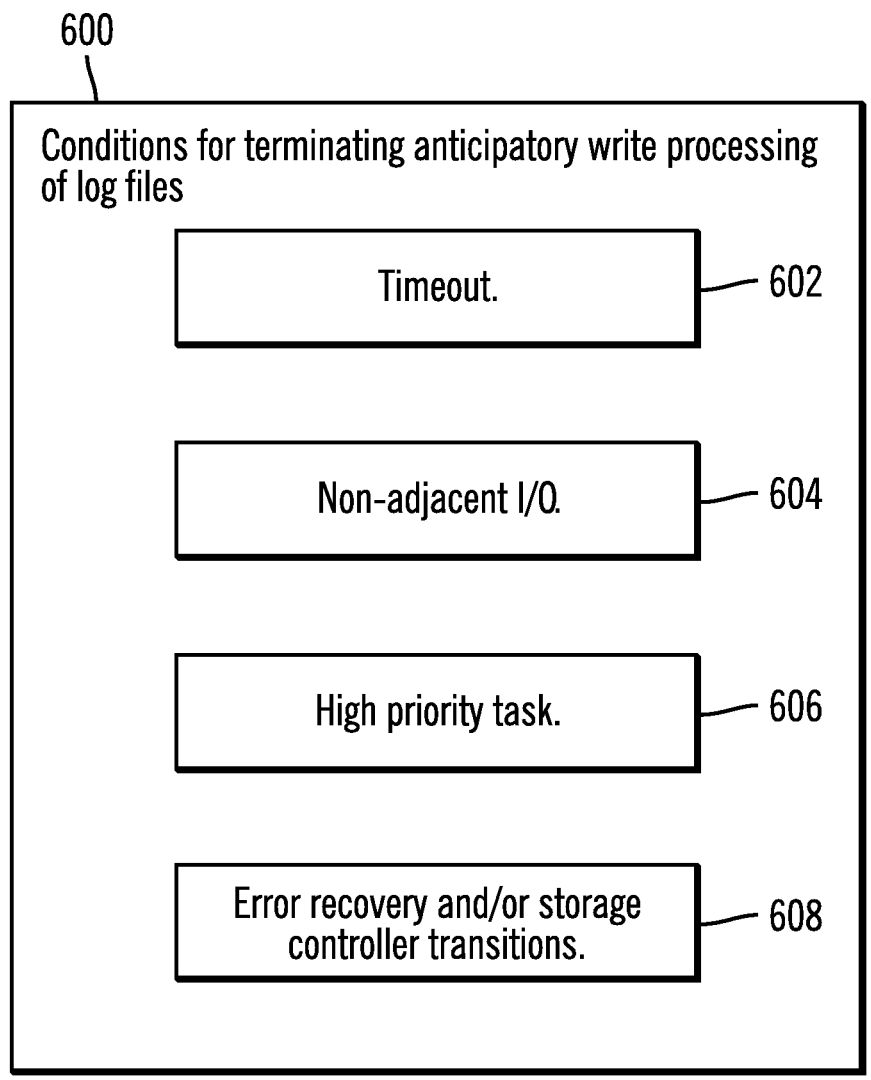
FIG. 6 illustrates a block diagram that conditions under which anticipatory write processing of log files is terminated, in accordance with certain embodiments.

FIG. 6 illustrates a block diagram 600 that conditions under which anticipatory write processing of log files is terminated, in accordance with certain embodiments. For example, in a timeout condition 602, if the write is not received for a time period, the anticipated write is terminated. The next write I/O in the stream can restart the stream.

Alternatively a host interlock may be required.

In the case of a non-adjacent I/O 604 there is an indication of a logic error. The anticipated write is terminated and host interlock required to restart.

If a high priority task 606 needs access to a resource then anticipatory write processing may be terminated. For example, asynchronous replication may require access to this track while forming a consistency group, and potentially other host or internal I/O (such as reads) may require access to the track. This may be caused by other processes such as utilities operating on the log file, or point in time copy. Access to the track is regained by queuing the TCB after giving up access to the other process. The log write stream may remain open.

Error recovery and/or box (i.e. storage controller) transition conditions 608 such as warmstart, node quiesce/resume and box shut down may terminate the log write stream. Host interaction is again required to restart the stream.

Figure 7:
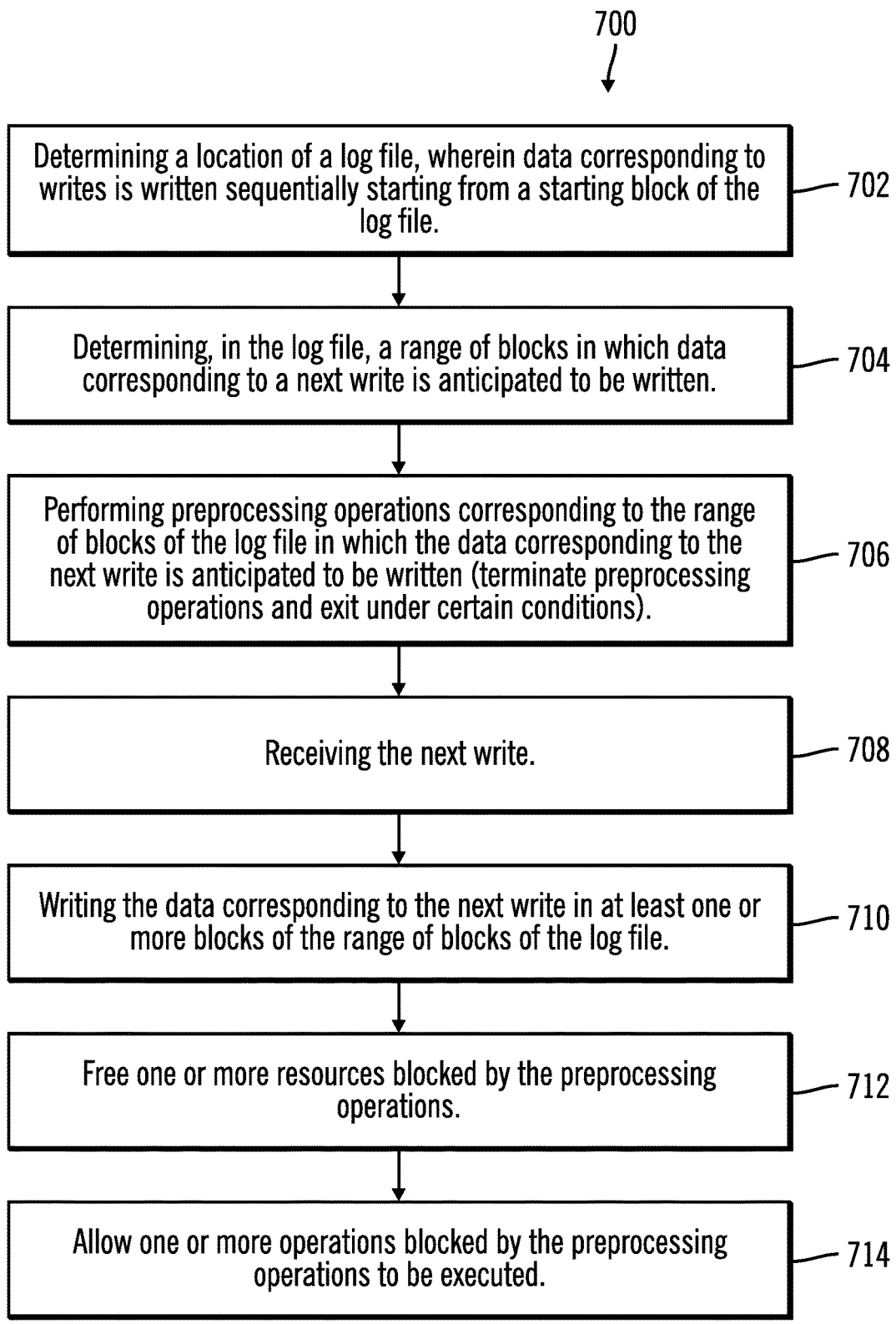
FIG. 7 illustrates a flowchart for anticipatory write processing of log files, in accordance with certain embodiments.

FIG. 7 illustrates a flowchart 700 for anticipatory write processing of log files, in accordance with certain embodiments. The operations shown in FIG. 7 may be performed by the anticipatory log file write processing module 112 of the storage management application 108 that executes in the storage controller 102.

Control starts at block 702, in which a location of a log file 126 is determined, wherein data corresponding to writes is written sequentially starting from a starting block of the log file. A determination is made (at block 704) in the log file 126 of a range of blocks in which data corresponding to a next write is anticipated to be written. Preprocessing operations are performed (at block 706) corresponding to the range of blocks of the log file in which the data corresponding to the next write is anticipated to be written. In certain embodiments, the preprocessing operations may be terminated and the process exited in response to certain conditions as shown in FIG. 6).

The next write operation is received (at block 708). In certain embodiments, in response to performing the preprocessing operations, and in response to receiving the next write operation, the data corresponding to the next write is written (at block 710) in at least one or more blocks of the range of blocks of the log file.

Control proceeds to block 712 in which in response to writing the data in the at least one or more blocks of the range of blocks of the log file, operations are performed to free one or more resources blocked by the preprocessing operations. Operations are also performed (at block 714) to allow one or more operations blocked by the preprocessing operations to be executed.

Therefore, FIGS. 1-7 illustrate certain embodiments to decrease the response time for writing to log files.

EXAMPLES

In a first embodiment, a location of a log file is determined, where data corresponding to writes is written sequentially starting from a starting block of the log file. A determination is made in the log file of a range of blocks in which data corresponding to a next write is anticipated to be written. Preprocessing operations are performed corresponding to the range of blocks of the log file in which the data corresponding to the next write is anticipated to be written.

In a second embodiment, the subject matter of the first embodiment may include that in response to performing the preprocessing operations, and in response to receiving the next write, the data corresponding to the next write is written in at least one or more blocks of the range of blocks of the log file. As a result, the next log file write may be completed with a faster response time (i.e., lower latency), in comparison to the situation where the preprocessing operations are not performed in anticipation of the next log file write.

In a third embodiment, the subject matter of the second embodiment may include that in response to writing the data in the at least one or more blocks of the range of blocks of the log file, operations are performed to free one or more resources blocked by the preprocessing operations. Operations are also performed to allow one or more operations blocked by the preprocessing operations to be executed. The freeing of resources allows the resources to be reused, and by unblocking the blocked operations the blocked operations may continue execution.

In a fourth embodiment, the subject matter of the first, second, or the third embodiment, may include that the preprocessing operations include: preallocating task control blocks for the next write; performing start I/O checking, where the start I/O checking determines whether an I/O is allowed to be performed; and performing intercepts of pending copy operations to determine if the pending copy operations are to be performed before or after the data corresponding to the next write is processed. The performing of the start I/O checking and the performing of the intercepts of pending copy operations in anticipation of the next log file write allows the next log file write to be performed with a faster response time.

In a fifth embodiment, the subject matter of the fourth embodiment may include that the preprocessing operations further include performing operations on a cache, and performing operations on a non-volatile store in which a copy of data in the cache is stored. The performing of the operations on the cache and the performing of the intercepts of the operations on the non-volatile store in anticipation of the next log file write allows the next log file write to be performed with a faster response time.

In a sixth embodiment, the subject matter of the fifth embodiment may include that the preprocessing operations further include allocating hardware resources for a direct memory access (DMA) for the next write. The pre-allocation of hardware resources for DMA in anticipation of the next log file write allows the next log file write to be performed with a faster response time.

In a seventh embodiment, the subject matter of the first, second, third, fourth, fifth, or sixth embodiment may include that the preprocessing operations are terminated if: the next write is not received in a predetermined amount of time; or a task with a higher level of priority than the next write needs a resource that is locked by the preprocessing operations; or a non-adjacent I/O is received; or the log file is to be closed in response to an error recovery or a transition of a storage controller that includes the processor. The terminating of the preprocessing operations allows other operations blocked for preprocessing to continue, and resources reserved for the preprocessing operations may be used once again.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
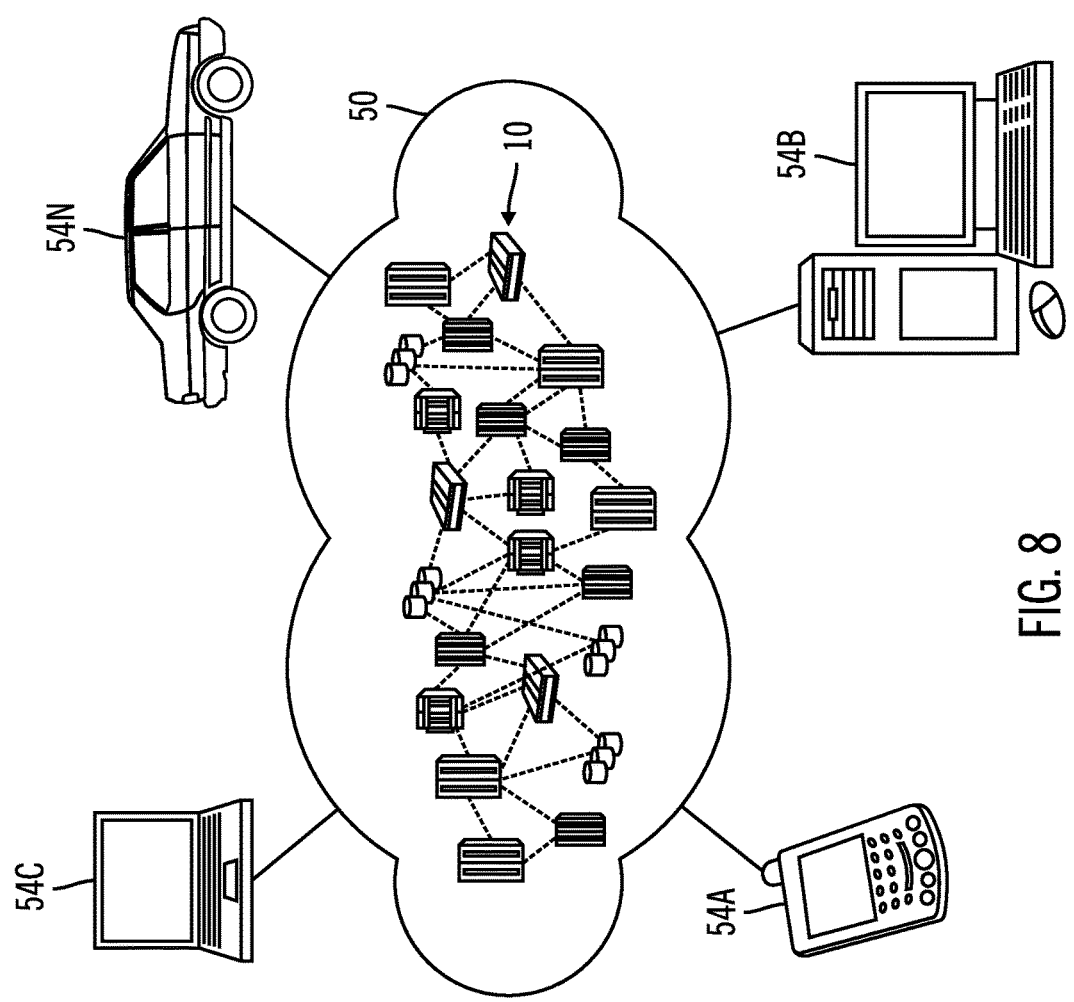
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
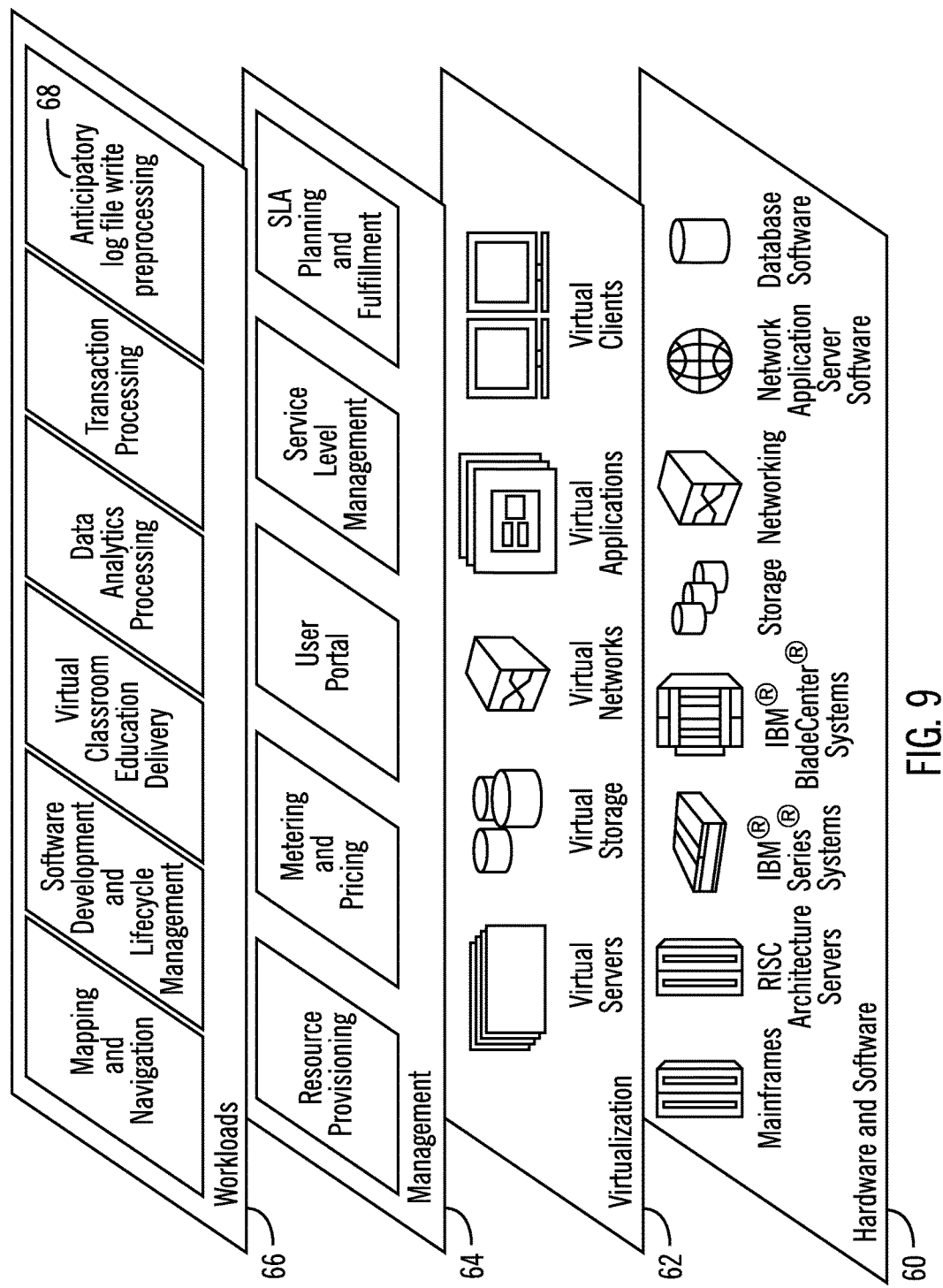
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the anticipatory log file write preprocessing 68 (e.g., in the storage management application 108) as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
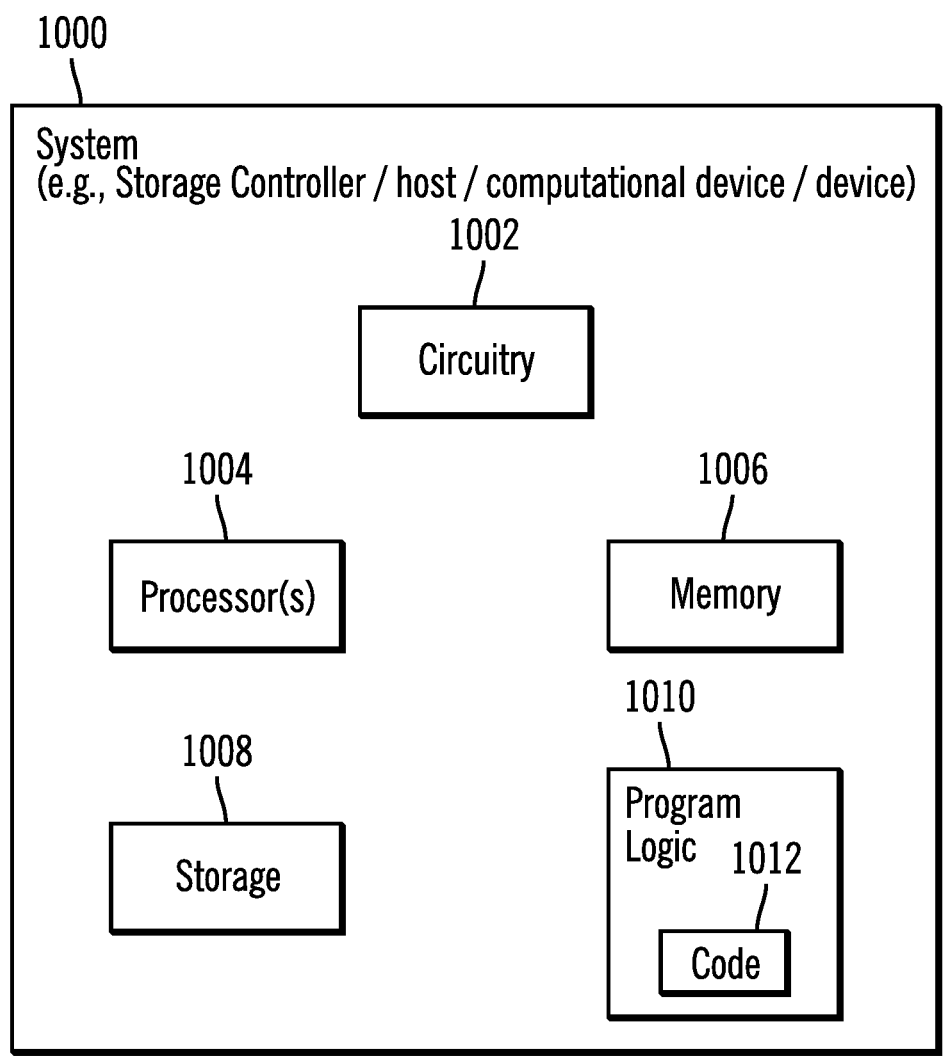
FIG. 10 illustrates a block diagram of a computational system that shows certain elements that may be included in the storage controller or the host shown in FIG. 1, in accordance with certain embodiments.

FIG. 10 illustrates a block diagram that shows certain elements that may be included in the host 104 or storage controller 102 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended, affiliates.

What is claimed is:

1. A method, comprising:
   determining, by a processor, a location of a log file, wherein data corresponding to writes is written sequentially starting from a starting block of the log file;
   determining, in the log file, a range of blocks in which data corresponding to a next write is anticipated to be written;
   performing preprocessing operations corresponding to the range of blocks of the log file in which the data corresponding to the next write is anticipated to be written;
   in response to performing the preprocessing operations, and in response to receiving the next write, writing the data corresponding to the next write in at least one or more blocks of the range of blocks of the log file; and
   in response to writing the data in the at least one or more blocks of the range of blocks of the log file, performing:
      freeing one or more resources blocked by the preprocessing operations; and
      allowing one or more operations blocked by the preprocessing operations to be executed.

2. A method, comprising:
   determining, by a processor, a location of a log file, wherein data corresponding to writes is written sequentially starting from a starting block of the log file;
   determining, in the log file, a range of blocks in which data corresponding to a next write is anticipated to be written; and
   performing preprocessing operations corresponding to the range of blocks of the log file in which the data corresponding to the next write is anticipated to be written, wherein the preprocessing operations include:
      preallocating task control blocks for the next write;
      performing start Input/Output (I/O) checking, wherein the start I/O checking determines whether an I/O is allowed to be performed; and
      performing intercepts of pending copy operations to determine if the pending copy operations are to be performed before or after the data corresponding to the next write is processed.

3. The method of claim 2, wherein the preprocessing operations further include:
   performing operations on a cache; and
   performing operations on a non-volatile store in which a copy of the data in the cache is stored.

4. The method of claim 3, wherein the preprocessing operations further include:
   allocating hardware resources for a direct memory access (DMA) for the next write.

5. A method, comprising:
   determining, by a processor, a location of a log file, wherein data corresponding to writes is written sequentially starting from a starting block of the log file;
   determining, in the log file, a range of blocks in which data corresponding to a next write is anticipated to be written; and
   performing preprocessing operations corresponding to the range of blocks of the log file in which the data corresponding to the next write is anticipated to be written, wherein the preprocessing operations are terminated if:
      the next write is not received in a predetermined amount of time; or
      a task with a higher level of priority than the next write needs a resource that is locked by the preprocessing operations; or
      a non-adjacent I/O is received; or
      the log file is to be closed in response to an error recovery or a transition of a storage controller that includes the processor.

6. A system, comprising:
   a memory; and
   a processor coupled to the memory, wherein the processor performs operations, the operations comprising:
      determining a location of a log file, wherein data corresponding to writes is written sequentially starting from a starting block of the log file;
      determining, in the log file, a range of blocks in which data corresponding to a next write is anticipated to be written;
      performing preprocessing operations corresponding to the range of blocks of the log file in which the data corresponding to the next write is anticipated to be written;
      in response to performing the preprocessing operations, and in response to receiving the next write, writing the data corresponding to the next write in at least one or more blocks of the range of blocks of the log file; and in response to writing the data in the at least one or more blocks of the range of blocks of the log file, performing:
freeing one or more resources blocked by the preprocessing operations; and
allowing one or more operations blocked by the preprocessing operations to be executed.

7. A system, comprising:
a memory; and
a processor coupled to the memory, wherein the processor performs operations, the operations comprising:
determining a location of a log file, wherein data corresponding to writes is written sequentially starting from a starting block of the log file;
determining, in the log file, a range of blocks in which data corresponding to a next write is anticipated to be written; and
performing preprocessing operations corresponding to the range of blocks of the log file in which the data corresponding to the next write is anticipated to be written, wherein the preprocessing operations include:
preallocating task control blocks for the next write;
performing start Input/Output (I/O) checking, wherein the start I/O checking determines whether an I/O is allowed to be performed; and
performing intercepts of pending copy operations to determine if the pending copy operations are to be performed before or after the data corresponding to the next write is processed.

8. The system of claim 7, wherein the preprocessing operations further include:
performing operations on a cache; and
performing operations on a non-volatile store in which a copy of the data in the cache is stored.

9. The system of claim 8, wherein the preprocessing operations further include:
allocating hardware resources for a direct memory access (DMA) for the next write.

10. A system, comprising:
a memory; and
a processor coupled to the memory, wherein the processor performs operations, the operations comprising:
determining a location of a log file, wherein data corresponding to writes is written sequentially starting from a starting block of the log file;
determining, in the log file, a range of blocks in which data corresponding to a next write is anticipated to be written; and
performing preprocessing operations corresponding to the range of blocks of the log file in which the data corresponding to the next write is anticipated to be written, wherein the preprocessing operations are terminated if:
the next write is not received in a predetermined amount of time; or
a task with a higher level of priority than the next write needs a resource that is locked by the preprocessing operations; or
a non-adjacent I/O is received; or
the log file is to be closed in response to an error recovery or a transition of a storage controller that includes the processor.

11. A computer program product, the computer program product comprising a computer readable storage medium having computer readable program code embodied therewith, the computer readable program code configured to perform operations on computational device, the operations comprising:
determining a location of a log file, wherein data corresponding to writes is written sequentially starting from a starting block of the log file;
determining, in the log file, a range of blocks in which data corresponding to a next write is anticipated to be written;
performing preprocessing operations corresponding to the range of blocks of the log file in which the data corresponding to the next write is anticipated to be written;
in response to performing the preprocessing operations, and in response to receiving the next write, writing the data corresponding to the next write in at least one or more blocks of the range of blocks of the log file; and
in response to writing the data in the at least one or more blocks of the range of blocks of the log file, performing:
freeing one or more resources blocked by the preprocessing operations; and
allowing one or more operations blocked by the preprocessing operations to be executed.

12. A computer program product, the computer program product comprising a computer readable storage medium having computer readable program code embodied therewith, the computer readable program code configured to perform operations on computational device, the operations comprising:
determining a location of a log file, wherein data corresponding to writes is written sequentially starting from a starting block of the log file;
determining, in the log file, a range of blocks in which data corresponding to a next write is anticipated to be written; and
performing preprocessing operations corresponding to the range of blocks of the log file in which the data corresponding to the next write is anticipated to be written, wherein the preprocessing operations include:
preallocating task control blocks for the next write;
performing start Input/Output (I/O) checking, wherein the start I/O checking determines whether an I/O is allowed to be performed; and
performing intercepts of pending copy operations to determine if the pending copy operations are to be performed before or after the data corresponding to the next write is processed.

13. The computer program product of claim 12, wherein the preprocessing operations further include:
performing operations on a cache; and
performing operations on a non-volatile store in which a copy of the data in the cache is stored.

14. The computer program product of claim 13, wherein the preprocessing operations further include:
allocating hardware resources for a direct memory access (DMA) for the next write.

15. A computer program product, the computer program product comprising a computer readable storage medium having computer readable program code embodied therewith, the computer readable program code configured to perform operations on computational device, the operations comprising:
determining a location of a log file, wherein data corresponding to writes is written sequentially starting from a starting block of the log file;
determining, in the log file, a range of blocks in which data corresponding to a next write is anticipated to be written; and
performing preprocessing operations corresponding to the range of blocks of the log file in which the data corresponding to the next write is anticipated to be written, wherein the preprocessing operations are terminated if:
  the next write is not received in a predetermined amount of time; or
  a task with a higher level of priority than the next write needs a resource that is locked by the preprocessing operations; or
  a non-adjacent I/O is received; or
  the log file is to be closed in response to an error recovery or a transition of the computational device.

16. A storage controller, comprising:
a cache;
a log file maintained in the storage controller; and
a storage management application maintained in the storage controller, wherein the storage management application performs operations, the operations comprising:
determining a location of a log file, wherein data corresponding to writes is written sequentially starting from a starting block of the log file;
determining, in the log file, a range of blocks in which data corresponding to a next write is anticipated to be written;
performing preprocessing operations corresponding to the range of blocks of the log file in which the data corresponding to the next write is anticipated to be written;
in response to performing the preprocessing operations, and in response to receiving the next write, writing the data corresponding to the next write in at least one or more blocks of the range of blocks of the log file; and
in response to writing the data in the at least one or more blocks of the range of blocks of the log file, performing:
  freeing one or more resources blocked by the preprocessing operations; and
  allowing one or more operations blocked by the preprocessing operations to be executed.

17. A storage controller, comprising:
a cache;
a log file maintained in the storage controller; and
a storage management application maintained in the storage controller, wherein the storage management application performs operations, the operations comprising:
determining a location of a log file, wherein data corresponding to writes is written sequentially starting from a starting block of the log file;
determining, in the log file, a range of blocks in which data corresponding to a next write is anticipated to be written; and
performing preprocessing operations corresponding to the range of blocks of the log file in which the data corresponding to the next write is anticipated to be written, wherein the preprocessing operations include:
  preallocating task control blocks for the next write;
  performing start Input/Output (I/O) checking, wherein the start I/O checking determines whether an I/O is allowed to be performed; and
  performing intercepts of pending copy operations to determine if the pending copy operations are to be performed before or after the data corresponding to the next write is processed.

18. A storage controller, comprising:
a cache;
a log file maintained in the storage controller; and
a storage management application maintained in the storage controller, wherein the storage management application performs operations, the operations comprising:
determining a location of a log file, wherein data corresponding to writes is written sequentially starting from a starting block of the log file;
determining, in the log file, a range of blocks in which data corresponding to a next write is anticipated to be written; and
performing preprocessing operations corresponding to the range of blocks of the log file in which the data corresponding to the next write is anticipated to be written, wherein the preprocessing operations are terminated if:
  the next write is not received in a predetermined amount of time; or
  a task with a higher level of priority than the next write needs a resource that is locked by the preprocessing operations; or
  a non-adjacent I/O is received; or
  the log file is to be closed in response to an error recovery or a transition of the storage controller.

* * * * *